United States Patent
Sato

(10) Patent No.: US 7,784,844 B2
(45) Date of Patent: Aug. 31, 2010

(54) INTERIOR TRIM MEMBER OF WORK VEHICLE AND METHOD OF MANUFACTURING THE SAME

(75) Inventor: Kan'ichi Sato, Hirakata (JP)

(73) Assignee: Komatsu Ltd., Tokyo (JP)

( * ) Notice: Subject to any disclaimer, the term of this patent is extended or adjusted under 35 U.S.C. 154(b) by 233 days.

(21) Appl. No.: 12/067,679

(22) PCT Filed: Sep. 13, 2006

(86) PCT No.: PCT/JP2006/318184

§ 371 (c)(1),
(2), (4) Date: Jul. 8, 2008

(87) PCT Pub. No.: WO2007/034722

PCT Pub. Date: Mar. 29, 2007

(65) Prior Publication Data

US 2008/0277955 A1     Nov. 13, 2008

(30) Foreign Application Priority Data

Sep. 21, 2005  (JP) .............................. 2005-274424

(51) Int. Cl.
*B60R 13/02* (2006.01)
(52) U.S. Cl. .................. 296/24.34; 296/70; 296/191
(58) Field of Classification Search .................. 296/70, 296/1.08, 24.3, 1.03, 37.12, 39.1, 97.7, 146.1, 296/146.7, 39.3, 191, 24.34; 264/513–553, 264/255, 261, 267, 275; *B60R 13/02*
See application file for complete search history.

(56) References Cited

U.S. PATENT DOCUMENTS

| | | | | |
|---|---|---|---|---|
| 2,818,933 A * | 1/1958 | Tell | .............................. | 180/90 |
| 4,347,276 A * | 8/1982 | Weber et al. | ................. | 428/160 |
| 4,373,745 A * | 2/1983 | Matsuno | ...................... | 280/752 |
| 4,416,926 A * | 11/1983 | Maglio | ......................... | 428/31 |
| 5,073,429 A * | 12/1991 | Steinke et al. | .................. | 428/71 |
| 5,111,619 A * | 5/1992 | Billin et al. | .................... | 49/502 |
| 5,259,655 A * | 11/1993 | Anderson | ...................... | 296/70 |
| 6,045,732 A * | 4/2000 | Nakatsuji et al. | ............ | 264/46.4 |
| 6,451,231 B1 * | 9/2002 | Harrison et al. | ............. | 264/45.3 |

(Continued)

FOREIGN PATENT DOCUMENTS

JP          1-134525          9/1989

(Continued)

*Primary Examiner*—Patricia L Engle
*Assistant Examiner*—Pinel E Romain
(74) *Attorney, Agent, or Firm*—Fish & Richardson P.C.

(57) ABSTRACT

A concave notch portion to which an interference body is fitted is formed in an interference region with the interference body existing in an incorporated portion of at least one side edge portion of an interior trim member. A cushion body made of an elastically deformable material is arranged in a periphery including the concave notch portion, and a structure member made of a material which is light and harder than the cushion body is arranged in the other region than the arranged region of the cushion body in the interior trim member. The skin member, the structure member and the cushion body are integrated by a molding. Consequently, an interior trim member is removable from an incorporated position, even in the case that a post exists in a driver seat, in the rigid interior trim member incorporated in the driver seat of various work vehicle.

12 Claims, 15 Drawing Sheets

U.S. PATENT DOCUMENTS

| | | | |
|---|---|---|---|
| 6,921,571 B2* | 7/2005 | Funakoshi | 428/156 |
| 6,945,583 B1* | 9/2005 | Cowelchuk et al. | 296/39.1 |
| 6,971,475 B2* | 12/2005 | Tompson et al. | 181/204 |
| 6,997,505 B2* | 2/2006 | Dry et al. | 296/146.7 |
| 7,033,660 B2* | 4/2006 | Cowelchuk et al. | 428/71 |
| 7,108,904 B2* | 9/2006 | Itoh et al. | 428/99 |
| 2003/0201571 A1* | 10/2003 | Davis et al. | 264/255 |
| 2006/0028047 A1* | 2/2006 | Adams et al. | 296/146.7 |
| 2006/0220414 A1* | 10/2006 | Boyer | 296/146.7 |

FOREIGN PATENT DOCUMENTS

| | | |
|---|---|---|
| JP | 05-050449 | 3/1993 |
| JP | 2004-203137 | 7/2004 |
| JP | 2005-59632 | 3/2005 |

\* cited by examiner

FIG.16
(a)
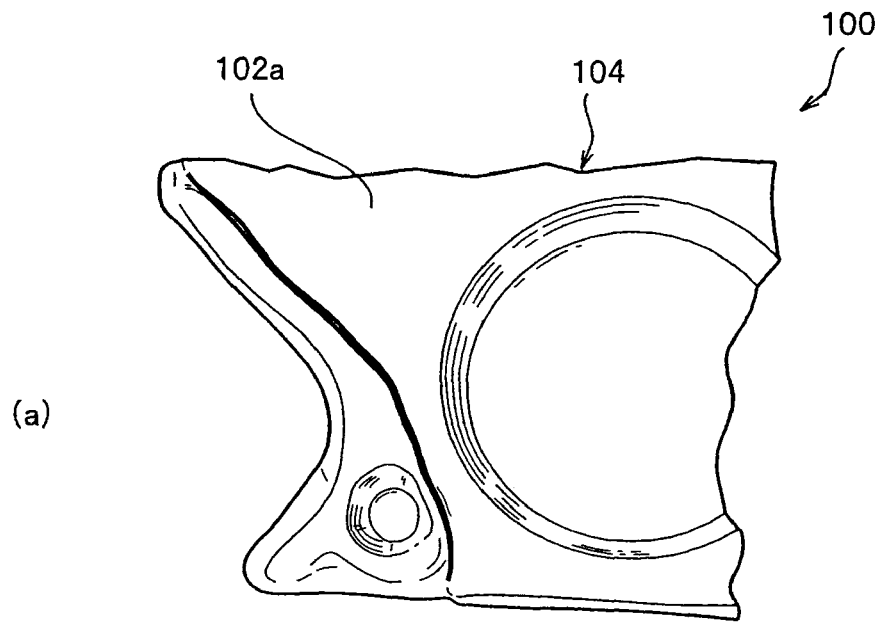
(b)
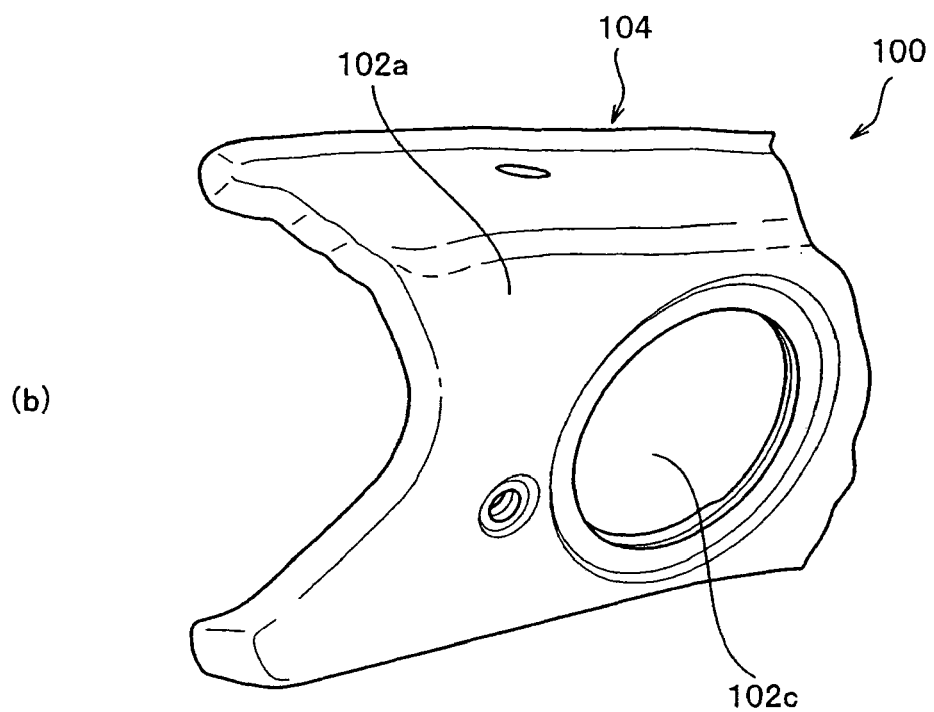

INTERIOR TRIM MEMBER OF WORK VEHICLE AND METHOD OF MANUFACTURING THE SAME

CROSS-REFERENCE TO RELATED APPLICATIONS

This application is a 371(c) National Phase of International patent application Serial No. PCT/JP2006/318184 filed Sep. 13, 2006 which claims priority to Japanese patent application Serial No. 2005-274424 filed Sep. 21, 2005, the entire disclosures of which are incorporated herein in their entireties.

TECHNICAL FIELD

The present invention relates to an interior trim member such as an instrument panel, a dash board or the like installed in a driver's cabin of a vehicle for various works, for example, a construction, a civil engineering and the like, or a work vehicle such as a dump truck, a fork lift, a farm machine or the like, and a method of manufacturing the same, and more particularly to an interior trim member which can be easily incorporated or detached under a state in which an interference body constituted by a rigid body such as a column or the like is arranged at an incorporated position of the interior trim member so as to protrude to an indoor side, and is interfered with the interior trim member so as to be prevented from being easily incorporated to and detached from the incorporated position, and a method of manufacturing the same. Further, the present invention relates to an interior trim member structured such that it is not necessary to assemble an air conditioner duct and a dew condensation is not generated in a duct.

BACKGROUND ART

Various and great amount of interior trim members are used within a passenger room of a general vehicle. A structure of the interior trim member is various. One example of the interior trim member used as various trims is disclosed in Japanese Unexamined Patent Publication No. 2005-59632 (patent document 1). In accordance with the publication 1, for the purpose of achieving a simplification of a forming mold and a simplification of a mold releasing work after forming as well as achieving a weight saving and a cost reduction, an interior trim part (a door trim) is manufactured by inserting a hard resin layer only to an inner portion of a position in which a rigidity is demanded in a foamed resin base material being light and having a shape retaining characteristic. A decorating member (a skin member) is integrally coated on a surface exposed to an outer portion of the foamed resin base material.

Specifically, as the foamed resin sheet, a foamed body is used in a thermoplastic resin. The thermoplastic resin is constituted by one or two or more of a polyethylene resin, a polypropylene resin, a polystyrene resin, a polyethylene terephthalate resin, a polyvinyl alcohol resin, a vinyl chloride resin, a polyamide resin, a polyacetal resin, a polycarbonate resin, an ionomer resin, an acrylonitrile/butadiene/styrene (ABS) resin and the like.

On the other hand, as the thermoplastic resin material used in the hard resin layer mentioned above, there can be listed up a normal thermoplastic resin such as a polyethylene resin, a polypropylene resin, a polystyrene resin, a polyethylene terephthalate resin, a polyvinyl alcohol resin, a vinyl chloride resin, an ionomer resin, a polyamide resin, a polyacetal resin, an acrylonitrile/butadiene/styrene (ABS) resin, a polycarbonate resin, and the like.

In this case, a steel post (ROPS) for protecting a driver at a time of being inverted is installed in both sides of a driver seat of a work vehicle such as a wheel loader or the like. The steel post has been conventionally attached later. However, in the latest driver seat, the steel post has been set as a standard specification, has been positioned as an important post for forming the driver cabin, and has been installed in a corner portion within the driver cabin precedently. As a result, it is necessary to install a partial interior trim member in an installed region in front of the steel post so as to overstride the steel post. For example, the driver seat of the wheel loader mentioned above is glazed as an inverted concave shape in a top elevational view in a front surface and right and left side surfaces for securing a visual range, and the steel post is provided in a rising manner in an end portion in a front side of the glass. Further, the glass surface in the front surface is formed as a downward inclined surface in which a lower end is protruded to the front side, from an upper end to a lower end thereof. A front dash panel in which various instruments and gauges, monitors, various switches, a grill for an air conditioner and a defroster and the like are arranged is appropriately horizontally installed along an inner side of the glass surfaces in the front surface and the right and left side surfaces.

Accordingly, since a space for installing a front dash panel is expanded little by little from an upper portion toward a lower side, it is unavoidable to install the front dash panel in such a manner as to intrude horizontally toward a front side. The front dash panel is constituted by a center portion which is approximately long sideways and is formed as a rectangular shape, and right and left wing portions extending in such a manner as to diagonally expand to a front side from both right and left ends of the center portion and formed as a rectangular long-plate shape. On the other hand, since the steel post is protruded to an indoor side, it is necessary to cut leading end portions of the front and left wing portions of the front dash panel in a triangular shape in a top elevational view for fitting to the post, thereby forming a so-called concave notch portion. However, even if the concave notch portion is formed as mentioned above, a dimension between corner portion ends in the driver side of the wing portions becomes longer than a dimension between inner side surfaces of the right and left posts. Accordingly, the post forms an interference body, and is interfered with the corner portions in the driver side of the right and left wing portions, and it is impossible to insert the front dash panel forward anymore. Further, if the front dash panel is once fitted by using any means, the front dash panel can not be easily detached, even in the case that it is intended to detach the front dash panel, for example, for replacing or repairing the instruments and gauges.

Accordingly, in prior art, in order to detach the front dash panel from the installed position or attach the front dash panel to the installed position, (1) the front dash panel is formed by a vacuum molding and is attached to and detached from the installed position while being torsion deformed to some extent by being practical about the front dash panel being simply used as a cover, or (2) the front dash panel having a high rigidity is divided into two sections at the center, the right and left concave notch portions are fitted to the right and left posts so as to be fixed, and the divided portions at the center are thereafter assembled and fixed by screws.

Patent Document 1: Japanese Patent Application Laid-Open No. 2005-59632

DISCLOSURE OF THE INVENTION

Problem to be Solved by the Invention

In this case, in accordance with the embodiment described in the patent document 1 mentioned above, the same polypropylene resin is used in both of the foamed resin sheet being light and having the shape retaining characteristic and the hard resin layer insert molded in the foamed resin sheet. The patent document 1 does not have any description relating to the hardness of the foamed resin sheet and the hard resin layer. Although a hardness of the normal polypropylene is 95R (Rockwell hardness R scale), it is impossible to know the hardness of the foamed resin sheet foamed by a foaming agent as far as reading the patent document 1. However, as far as using the normal thermoplastic resin mentioned above, it is impossible to expect an elasticity such as a sponge or a foamed body of a thermoplastic elastomer in material. Further, the interior trim member for the motor vehicle described in the patent document 1 is structured by previously arranging the foamed resin sheet made of the normal thermoplastic resin integrally formed by covering a skin member on a surface thereof by a lamination within a cavity (a core) in a lower mold in such a manner that a back surface is set to a lower side, moving down an upper mold so as to close the mold, and thereafter locally injecting a hard resin material from a lower surface side of the foamed resin sheet so as to make the resin material into the foamed sheet. As a result, the foamed resin sheet portion in the region in which the hard resin layer is formed is molten and thereafter hardened while bubbles being crushed due to extremely high injection pressure and high temperature, so as to form a region having a high hardness in comparison with the other region. Further, if the foamed resin sheet is released from the mold, an internal stress of the foamed resin sheet portion in the region connoting the hard resin layer is instantaneously released so as to push up the skin material, and expresses a locally expanded region, and a neat surface shape is hard to be obtained in an outer appearance.

On the other hand, in the case of executing the installing methods as mentioned in the items (1) and (2) mentioned above for avoiding the interference with the steel post, as well as forming the concave notch portion in the leading end portions of the right and left wing portions of the front dash panel as mentioned above, the following problems are left.

The interior trim member manufactured by the vacuum formation as mentioned in the item (1) is expected only as a function of a cover, the interior trim member is too soft in structure, and it is impossible to assemble a duct for an air conditioner or for a defroster. Further, it is hard to incorporate the meters in the cover side.

Further, in the case of the two-piece type interior trim member as described in the item (2), a parting line in the center portion comes into prominence and becomes poor in design. It is necessary to freshly incorporate the duct for the air conditioner or the like in back surface side after finishing the incorporation of the interior trim member. Thus, it is necessary to work within a narrow space and it becomes hard to incorporate.

On the contrary, there can be considered a method of assembling the other formed product only in a region corresponding to the concave notch portion while avoiding the concave notch portion formed in the end portion of the interior trim member having a high rigidity. However, since a boundary portion comes into prominence in an outer appearance, and a sense of discomfort is generated, it is hard to employ this method.

On the other hand, in the front dash panel in which the duct for the air conditioner is incorporated, the duct is manufactured by a rotational molding method or is formed by a blow molding method. It is necessary to align the duct shape with the shape of the attaching surface of the front dash panel. However, an outer shape is determined by an inner diameter of the mold and a thickness of the formed product in the forming method mentioned above, and it is extremely hard to accurately control an air flow. Further, since the duct for the air conditioner is constituted by a non-foamed resin molded product, it is unavoidable to generate a dew condensation in a region in which a humidity is high due to lack of insulation efficiency.

A main object of the present invention is to provide a rigid interior trim member incorporated in a driver seat of a work vehicle such as a construction machine, a fork lift, a farm machine or the like, in which the interior trim member can be easily incorporated in an incorporated position or detached form the incorporated position even in the case that the post or the like interfered particularly at a time of incorporating or detaching exists in the driver seat. Further, a secondary object of the present invention is to provide an interior trim member in which it is unnecessary to incorporate the ducts for the air conditioner freshly, a rigidity and a strength are simultaneously provided, and a dew condensation is not generated.

Means for Solving the Problem

The objects mentioned above can be effectively achieved by the interior trim member of the work vehicle in accordance with the present invention described below.

In accordance with a first main aspect of the present invention, there is provided an interior trim member which has a panel-shape, is incorporated in an incorporating portion of a work vehicle, and has a desired curved shape in which a skin member is integrally covered on a front surface, wherein an interference region interfering with an interference body existing in the incorporating portion is provided at least in one of right and left side edge portions which are orthogonal to an attaching and detaching direction parallel to a panel surface of the interior trim member, a concave notch portion to which the interference body is fitted is formed in the interference region, the interference region of the interior trim member is formed as an elastic region constituted by a cushion body made of an elastically deformable material, a region other than the elastic region of the interior trim member is set to a hard region constructed by a structure member which is light and is made of a harder material than the cushion member, and the skin member, the cushion body and the structure member are integrally formed.

In this case, a hardness of the cushion body is equal to or less than 87 in C hardness (Society of Rubber Industry, Japan Standard Specification SRIS 0101), and it is preferable that an elastic module in bending of the structure member is equal to or more than 500 MPa, a bending strength is equal to or more than 20 MPa, and a coefficient of thermal conductivity is equal to or less than 0.1 W/m° K. Further, it is desirable that at least the cushion body is constituted by a foamed body of a semi-hard polyurethane (or a thermoplastic elastomer resin), and the structure body is made of a thermosetting resin material. It is further preferable that at least the cushion body is integrally formed in a part of the structure member and the skin member by a foaming. Further, the structure member is structured by a hard foaming material such as a polyurethane or the like constituted by a thermoplastic resin.

In accordance with the present invention, the structure can be made such that a plurality of ribs are formed on a back surface of the structure member having the structure mentioned above by an integral molding. In this case, the structure can be made such that the ribs construct a wall surface of a ventilation passage, an open surface of the wall surface is closed by a lid member so as to form two or more ventilation passages, and a through hole for an air conditioner and a defroster is formed in the ventilation passage.

The interior trim member having the structure mentioned above can be efficiently manufactured by the invention in accordance with a method of manufacturing an interior trim member in a work vehicle described below.

In accordance with a main structure thereof, there is provided a method of manufacturing a panel-shaped interior trim member incorporated in an incorporating portion of a work vehicle, and having a desired curved shape in which a skin member is integrally covered on a front surface, wherein the method comprises the steps of arranging a skin member along a cavity of at least one of a pair of upper and lower molds so as to come close contact, preliminary arranging a structure member which is light and is made of a hard thermosetting resin having a rigidity in a non-interference region of a cavity of the other mold which is not interfered with an interference body existing in the incorporating portion of at least one of right and left side edge portions which are orthogonal to a parallel attaching and detaching direction to a panel surface of the interior trim member at a time of being detached and attached to the interference body, filling a cushion member at least in an interference region interfering with the interference body formed between a mold having an upper mold and a lower mold at a time of closing the mold, and the skin member and the structure member, and integrally forming with the skin member and the structure member.

In this case, the following two steps can be employed for the method of integrally forming the cushion member with the skin member and the structure member within the space formed between the mold, and the skin member and the structure member.

First of the steps is to integrally cover the skin member on the structure member by a laminate formation, and to introduce a polyurethane into a space left between the mold at a time of closing the mold, and the skin member and the structure member so as to foam on the spot and integrally form the cushion body between the skin member and the structure member.

Second of the steps is to previously form the structure member, to arrange the structure member in the upper mold as well as arranging the skin member in the lower mold in such a manner as to form a gap between the skin member and the structure member at a time of clamping the mold, and to integrally form the cushion body in the skin member and the structure member by introducing the polyurethane to all the space including the gap formed between the mold at a time of closing the mold, and the skin member and the structure member so as to foam on the spot.

Effect of the Invention

The periphery including the concave notch portion fitted while interfering with the interference body is constructed by the cushion body made of the elastically deformable material, and the structure member made of the material which is light and harder than the cushion body is arranged in the other region than the region in which the cushion body is arranged in the interior trim member so as to be integrated. This makes it possible to easily attach and detach the interior trim member over the interference body by elastically deforming the portion of the cushion body near the concave notch portion, at a time of attaching and detaching the interior trim member to the incorporated position or from the incorporated position. Since each of the cushion body and the structure member at this time is provided with the hardness mentioned above, it is possible to securely achieve an elastic deformation and return of the portion of the cushion body, and it is possible to easily attach and detach the interior trim member while maintaining the original shape of the interior trim member. Further, since the cushion body and the structure member are covered and integrated by the same skin member, an excellent peeling strength is achieved, the cushion body and the structure member are not broken even by carrying out a repeated attaching and detaching operation, and an outer appearance can be long maintained.

In the case that the cushion body is integrated with a part of the structure member and the skin member by the foaming, a peeling strength becomes high. Particularly, if the skin member is formed by a soft or semi-hard urethane resin, a fiber or the like, the cushion body is structured by a semi-hard urethane foamed body, and the structure member is structured by a foamed body such as a hard urethane or the like, an adhesion force is increased because the skin member, the cushion body and the structure member have an affinity with each other, and the peeling strength is further improved. At this time, the hardness of the cushion body and the structure member can be optionally changed within the range of the hardness mentioned above on the basis of a role of the interior member. Further, a material obtained by a sheet metal working is generally used in the driver seat or the like to which this kind of interior trim member is installed. Even if a dimensional tolerance on a manufacturing appears to some extent, a dispersion thereof is efficiently reduced by an elasticity of the cushion body. In addition, the cushion layer can be interposed in a whole of the interior member. In this case, a step is not generated in a boundary portion with respect to a single region of the cushion body, and a glossy outer appearance can be obtained.

The interior trim member in accordance with the present invention having the structure mentioned above can be efficiently and easily manufactured by the manufacturing method mentioned above in accordance with the present invention. Since the interior trim member in accordance with the present invention is having the structure mentioned above, there is left the space for forming the cushion body in the mold at the final forming time. The skin member and the structure member are integrally formed by arranging the skin member along the cavity of the lower mold in a close contact manner, arranging the structure member made of the thermosetting resin material corresponding to the hard material being light and having the rigidity in the region which is not interfered with the interference body existing at the incorporated position at a time of inserting, at least in one side edge portion which is orthogonal to the inserting direction to the incorporated position of the interior trim member in the cavity of the upper mold, and thereafter filling the cushion member within the space formed between the mold having the upper mold and the lower mold at a time of closing the mold, and the skin member and the structure member.

At a time of filling the cushion member in the space, two methods are provided in accordance with the present invention. One of them is to set the skin member to the lower mold, and thereafter vacuum suck so as to deform the skin member along a whole shape of the lower mold. Next, the structure member is integrally formed in the skin member by moving down the upper mold so as to close the mold, and injecting the thermosetting resin material of the structure member. The cavity of the upper mold at this time is formed in the region except the filling space of the cushion member. For example, an insertion mold is inserted to the filling space of the cushion except the region at a time of forming the structure member. After finishing the formation of the structure member, three elements are integrated by detaching the insertion mold inserted to the filling space of the cushion member, and introducing the cushion member to the cushion member filling space formed there so as to foam. The interior trim member manufactured at this time is structured such that the elastically deformable cushion body including the portion near the concave notch portion is integrally formed in the side surface of the structure member made of the hard resin, and the skin member is directly coated over a whole of the surface of the structure member and the cushion body so as to be integrated.

According to the other, the structure member is previously formed, and the skin member and the structure member are respectively arranged in the lower mold and the upper mold at a time of closing the mold. The region forming the cushion body at this time is left so as to be mounted and fixed to the lower mold, and the skin member is vacuumed along the cavity of the upper mold so as to be held in the upper mold. If the mold is closed by moving down the upper mold in this state, the cavities of the upper mold and the lower mold are formed in such a manner that a desired gap is formed between the skin member and the structure member. If the mold is closed, the foamed resin is introduced into the gap and the left space, and the space is filled and formed by the foamed body, whereby three elements are integrated. It is preferable to use the semi-hard polyurethane which can be directly foamed on the spot, for the foaming at this time. Alternatively, it is possible to use a thermoplastic elastomer resin to which a foaming agent is added, as the cushion member. Further, it is preferable to use the hard polyurethane foamed body which is light and is rich in a heat insulating property, for the structure member.

BRIEF DESCRIPTION OF THE DRAWINGS

FIG. 16 is a partial surface view showing an end portion outer appearance shape of a finished product in accordance with the first and second embodiments.

Figure 1:
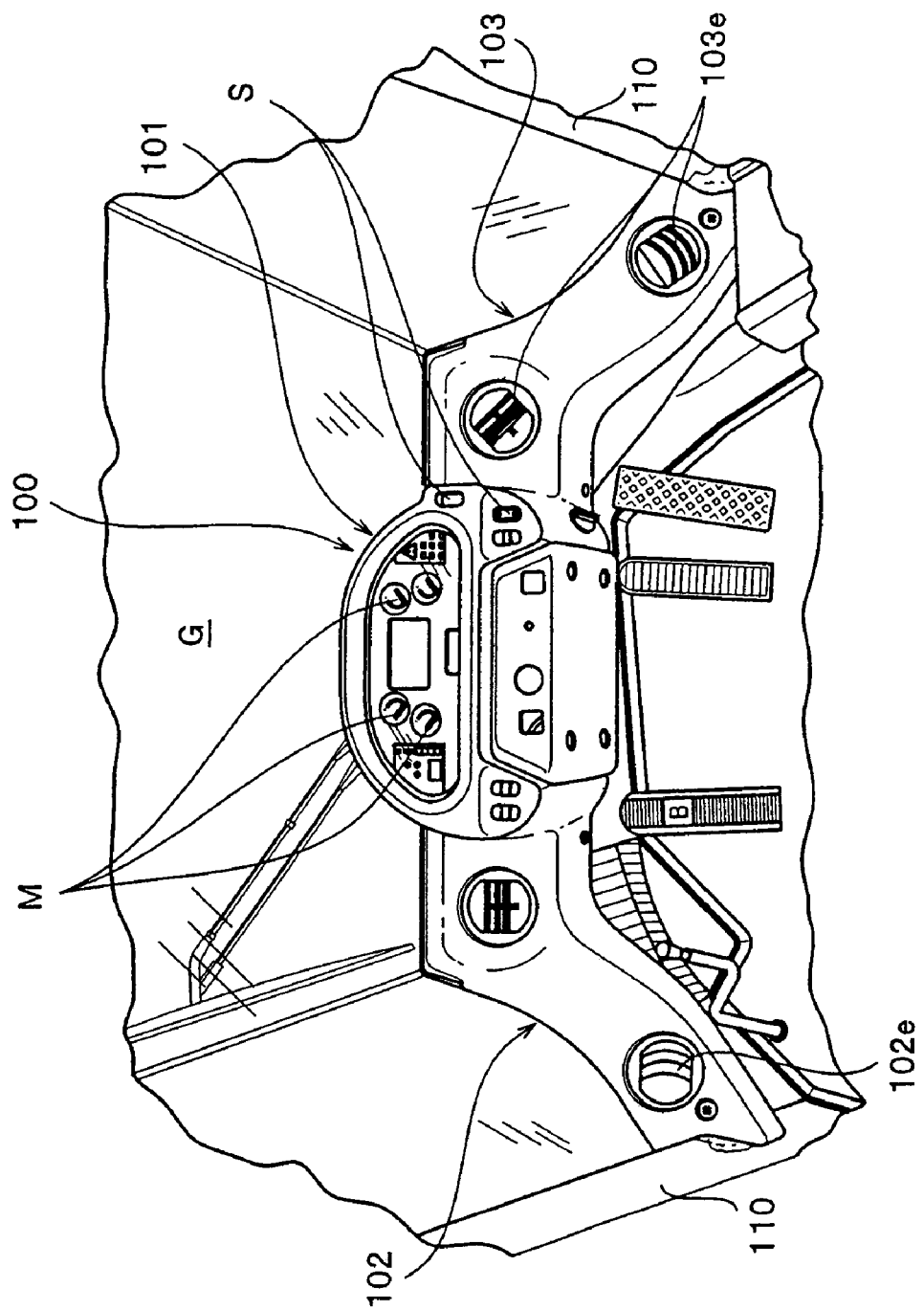
FIG. 1 is a partial perspective view of an inner side of a passenger cabin at a time of viewing a driver seat of a wheel loader from a diagonal upper side in a near side.

DESCRIPTION OF REFERENCE NUMERALS 10 skin member
11 foamed polyurethane layer
20 inner portion supporting base material
21 structure member (hard polyurethane foamed body)
22 closed-loop shaped rib
22a oval rib
22b triangular rib
25 cushion body (semi-hard polyurethane foamed body)
30 lid member
3 coupling ring
31a flange
32, 33 first and second thick portions
34, 35 first and second air introduction holes
36 stop screw
37 screw (tap screw)
50 mold
51 lower mold
52 upper mold
53 insertion mold
100 dash board (interior trim member)
101 instruments and gauges arranged portion
102, 103 left and right wing portions
102a, 103a upper walls
102b, 103b left and right side walls
102c, 103c air outlets for air conditioner
102d, 103d air outlets for defroster
102e, 103e grills
104, 105 concave notch portions
110 steel post (interference body)
M instruments and gauges
S switches
G glass
A structure member forming space
B cushion body forming space
C1 front side corner portion of concave notch portion
C2 near side corner portion of concave notch portion
D gap

BEST MODE FOR CARRYING OUT THE INVENTION

A description will be given specifically of typical embodiments in accordance with the present invention with reference to the accompanying drawings.

FIG. 1 shows an outer appearance at a time of viewing a part of a passenger cabin in which a dash board 100 corresponding to an interior trim member is installed to a front side of a driver seat of a wheel load in accordance with a first embodiment of the present invention. As is understood from the drawing, an instruments and gauges arranging portion 101 to which various instruments and gauges M and switches S are attached is arranged in a center portion of the dash board 100, and there are provided left and right wing portions 102 and 103 extending to a diagonally near side while expanding a gap from both left and right side ends. The instruments and gauges arranging portion 101 is formed as a horizontally C-shaped form, and the instruments and gauges M are fitted and fixed to a center thereof while being tilted to a front side. A portion to which the switches S are attached is protruded toward a front side from the left and right end portions.

Figure 2:
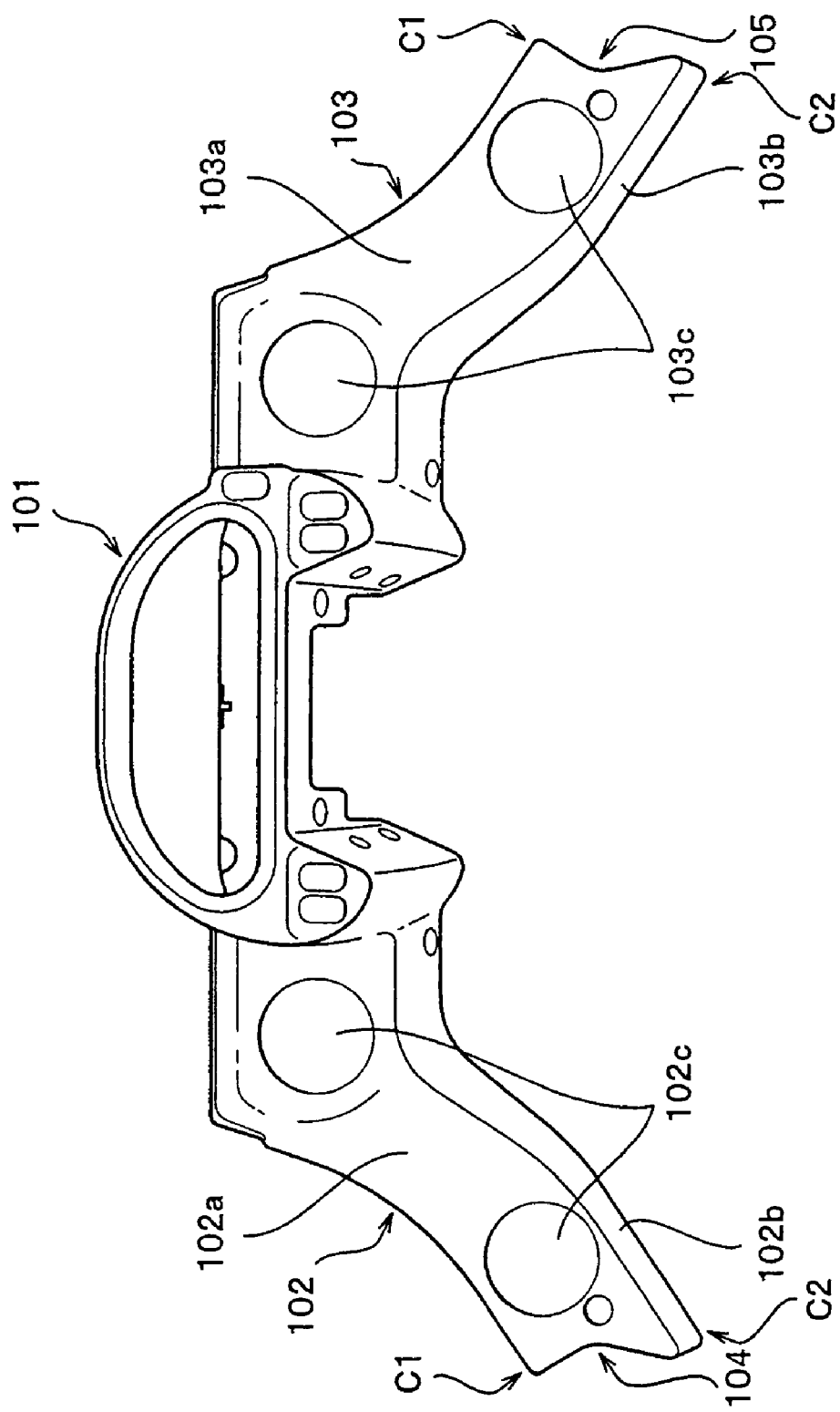
FIG. 2 is a top elevational view of a molded dash board arranged in a front side of the driver seat and made of a synthetic resin.

FIG. 2 shows the dash board 100. The left and right wing portions 102 and 103 extend linearly to left and right sides from the instruments and gauges arranging portion 101, and are bent from the middle thereof so as to extend to a diagonally near side in such a manner as to expand a gap toward the near side. Further, the left and right wing portions 102 and 103 are formed as symmetrical shapes while holding the instruments and gauges arranging portion 101 therebetween, left and right side walls 102b and 103b are continuously provided along the extending direction of the upper walls 102a and 103a, a whole having an open back surface side is formed as a flat plate shape, and an outer shape thickness is increased gradually wile curving an upper surface to an upper side in a depth direction from the near side in a front elevational view. A pair of left and right concave notch portions 104 and 105 notched as a triangular shape in a top elevational view are formed in outer sides of the near side end portions of the left and right wing portions 102 and 103.

Figure 3:
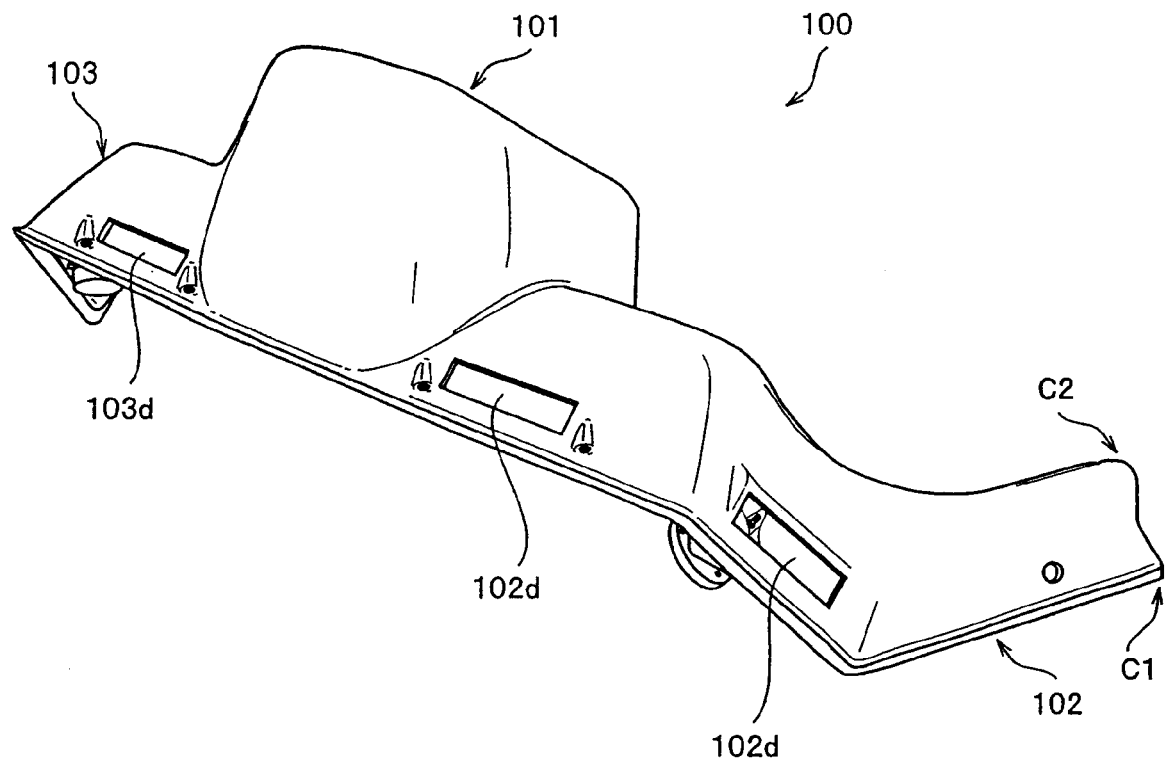
FIG. 3 is a perspective view as seen from a back surface of the dash board.

As shown in FIG. 2, circular air outlets 102c and 103c for an air conditioner are formed totally four in a region extending linearly to left and right sides of upper walls 102a and 103a of the left and right wing portions 102 and 103, and a region adjacent to the concave notch portions 104 and 105. Further, as shown in FIG. 3, rectangular air outlets 102d and 103d for a defroster are respectively formed in a region opposing to glasses of the upper walls 102a and 103a of the left and right wing portions 102 and 103 in the same manner. Circular grills 102e and 103e and rectangular grills (not shown) are installed respectively to the air outlets 102c and 103c for the air conditioner and the air outlets 102d and 103d for the defroster.

Figure 4:
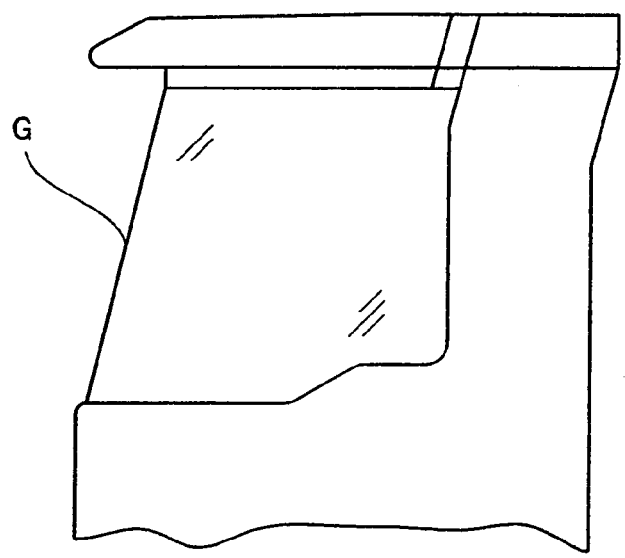
FIG. 4 is a partial side elevational view of the wheel loader showing a front glass portion of a driver cabin.

A steel post 110 is previously provided in a rising manner in both sides of a driver seat in a work vehicle such as a wheel loader or the like so as to protrude opposing side surfaces to an inner side of the vehicle from left and right vehicle walls, for protecting a driver at a time of being inverted, before installing the dash board 100. On the other hand, a space in a front side of the steel post 110 forms an assembled space in which the dash board 100 including the protruding portion of the post 110 is assembled. In order to expand a visual range of the driver, a whole along an outer side surface of the dash board 100 from a portion around a ceiling of a driver cabin is glazed. Further, a glass surface G in a front side of the driver seat is formed as a downward inclined surface protruded and inclined to a front side gradually from an upper side to a lower side, as shown in FIG. 4. Accordingly, the space of the driver seat is formed as a truncated pyramid shape in which a horizontal cross sectional area is increased gradually from an upper side toward a lower side, and the dash board 100 is assembled in a bottom surface portion. However, since a maximum width between both the right and left ends of the dash board 100 becomes larger than a dimension between opposing surfaces of the right and left posts 110, both the right and left end portions having the maximum width interfere with the post 110 even if it is intended to insert the dash board 100 horizontally in a depth direction, which makes it impossible to smoothly insert the dash board 100. If it is intended to install the dash board while tilting the dash board diagonally so as to move the dash board from the upper space portion to the bottom surface portion, a smooth installation can not be achieved because the installing space of the dash board 100 has the shape as mentioned above.

Figure 5:
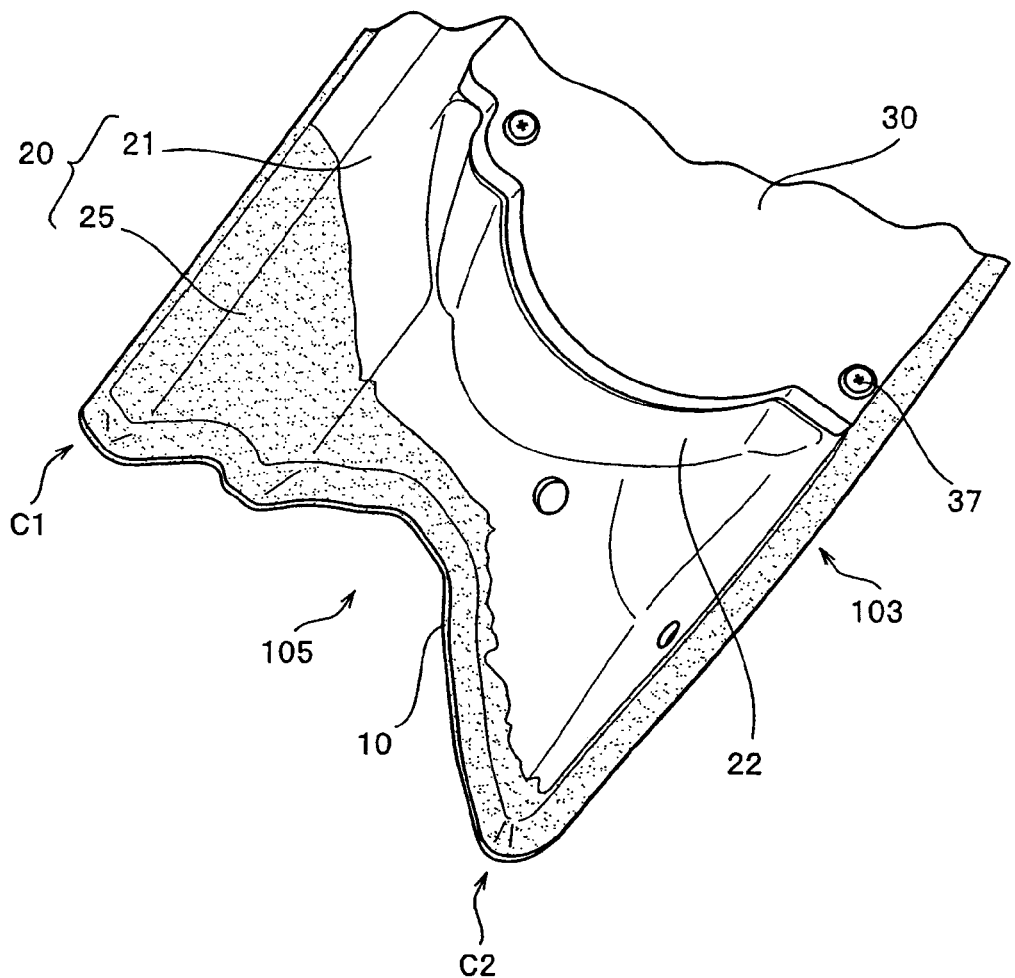
FIG. 5 is a partial back elevational view of a concave notch portion of a leading end of a wind portion of a dash board in accordance with a typical embodiment of the present invention.

Since it is necessary to fit the leading end portions of the left and right wing portions 102 and 103 to the steel post 110 as shown in FIGS. 1 and 2, in the dash board 100 installed to the bottom surface portion, the concave notch portions 104 and 105 are formed. However, even if the concave notch portions 104 and 105 are formed, the corner portions C1 in the front side of the concave notch portions 104 and 105 still interfere with the steel post 110 for fitting to the post 110. Accordingly, the present invention is structured such that a soft cushion body 25 which tends to be locally deformed elastically is arranged in a region near a portion including the concave notch portions 104 and 105, particularly, a peripheral region including the front side corner portions C1 of the concave notch portions 104 and 105 and an outer side edge of a near side corner portion C2, as shown in FIG. 5 in an enlarged manner, in the present embodiment.

Accordingly, the dash board 100 in accordance with the present embodiment is constituted by a skin member 10 which is previously formed as a complicated shape as mentioned above and serving as an exterior trim member, and an inner portion supporting base material 20 in which the skin member 10 is covered and integrated, in the same manner as the conventional structure. As much as a special method in the conventional structure, as described in the patent document 1 mentioned above, a whole of a base material of trims for the vehicle is structured by a foamed sheet made of a normal thermoplastic resin material being light and having a shape retaining characteristic, and a hard resin layer made of the same kind of thermoplastic resin as the foamed sheet is integrally formed in a region in which a rigidity is locally demanded, in such a manner as to be connoted while being intruded to an inner portion of the foamed sheet by an insert molding. However, even if the method as described in the patent document 1 is employed in the conventional general interior trim member in the work vehicle, the foamed sheet constructing the supporting base material of the trims in the patent document 1 has a high hardness in material, and the region connoting the hard resin layer becomes hard particularly in hardness due to the insert molding. Therefore, the problem mentioned above can not be solved. The interior member in the work vehicle is generally structured by an injection molded product of one thermoplastic resin material, and is freshly assembled after dividing the interior trim member of the work vehicle in which the interference with the interference body corresponding to a subject of the present invention, into two sections in the center as mentioned above and setting tem to the installed position.

In the interior trim member (the dash board 100) in accordance with the present invention, the inner portion supporting base material 20 uses a hard structure member 21 occupying a main portion of the base material, and a soft cushion body 25 arranged only in a region interfering with the post 110 and being capable of easily deforming elastically. In the present embodiment, a hard foamed polyurethane is used in the hard structure member 21, and a semi-hard polyurethane is used in the elastically deformable soft cushion body 25. Since the foamed urethane can be formed while being foamed on the spot, the foamed urethane has a high manufacturing efficiency, and can be easily foamed in an assembling work front of the vehicle. In this case, both bubbles of the hard and semi-hard foamed polyurethanes are constituted by independent bubbles, and a thin and smooth skin layer is formed on a formed surface of the hard foamed polyurethane constructing the structure member 21.

Figure 6:
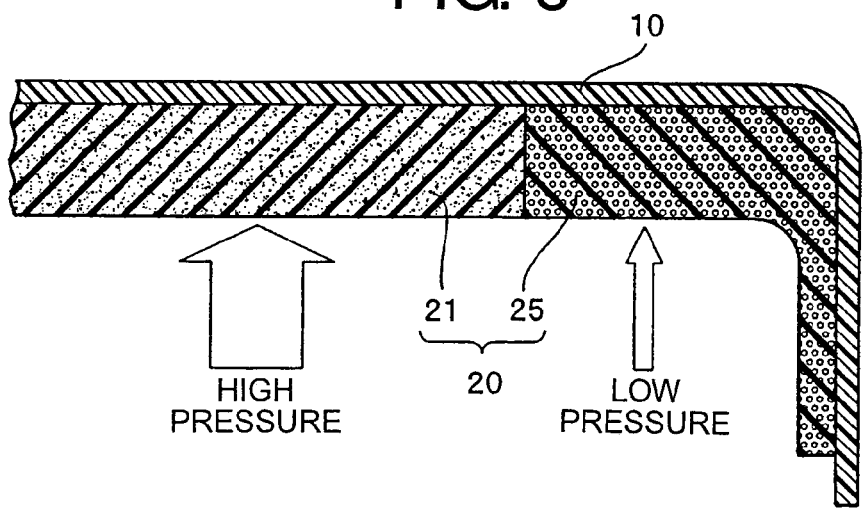
FIG. 6 is a partial cross sectional view showing an end portion structure of a dash board in accordance with a first embodiment of the present invention.

The dash board 100 in accordance with the first embodiment has a structure shown in FIG. 6. In the drawing, reference numeral 10 denotes a skin member, reference numeral 20 denotes an inner portion supporting base material, reference numeral 21 denotes a structure member made of a hard foamed urethane, and reference numeral 25 denotes a soft and elastic cushion body. In the present embodiment, the structure member 21 and the cushion body 25 are integrally bonded in a boundary portion by a molding. On the other hand, the skin member 10 is also integrally formed over a whole of outer surfaces of the structure member 21 and the cushion member 25 by a foaming of the structure member 21 and the cushion member 25. The dash board 100 provided within the structure mentioned above is manufactured in accordance with the following procedure.

FIGS. 7 to 11 schematically show the molding process. In this case, although an illustration is omitted, the sheet-shaped skin member 10 is simultaneously vacuum sucked and heat compressed within the upper and lower molds, and is previously shaped in the shape along the outer surface of the finished produce of the dash board 100. In general, a drawing pattern is applied to the surface of the skin member 10 at the same time of shaping. The material used in the skin member 10 can employ a material which is excellent in compatibility with the structure member 21 and the cushion body 25, and a general thermoplastic resin or thermoplastic elastomer as far as a certain level of flexibility can be obtained. In the present embodiment, since the polyurethane which is excellent in bonding characteristic to most of synthetic resins is used in the structure member 21 and the cushion body 25, it is possible to optionally apply a soft resin such as a polyethylene, a thermoplastic elastomer or the like to the skin member 10. In the present embodiment, there is used a polyvinyl chloride which is excellent in weather resistance and heat resistance and is softened by adding a plasticizing material, for a material of the skin member 10. In this connection, a thickness of the skin member 10 is between 0.6 and 0.9 mm.

Figure 7:
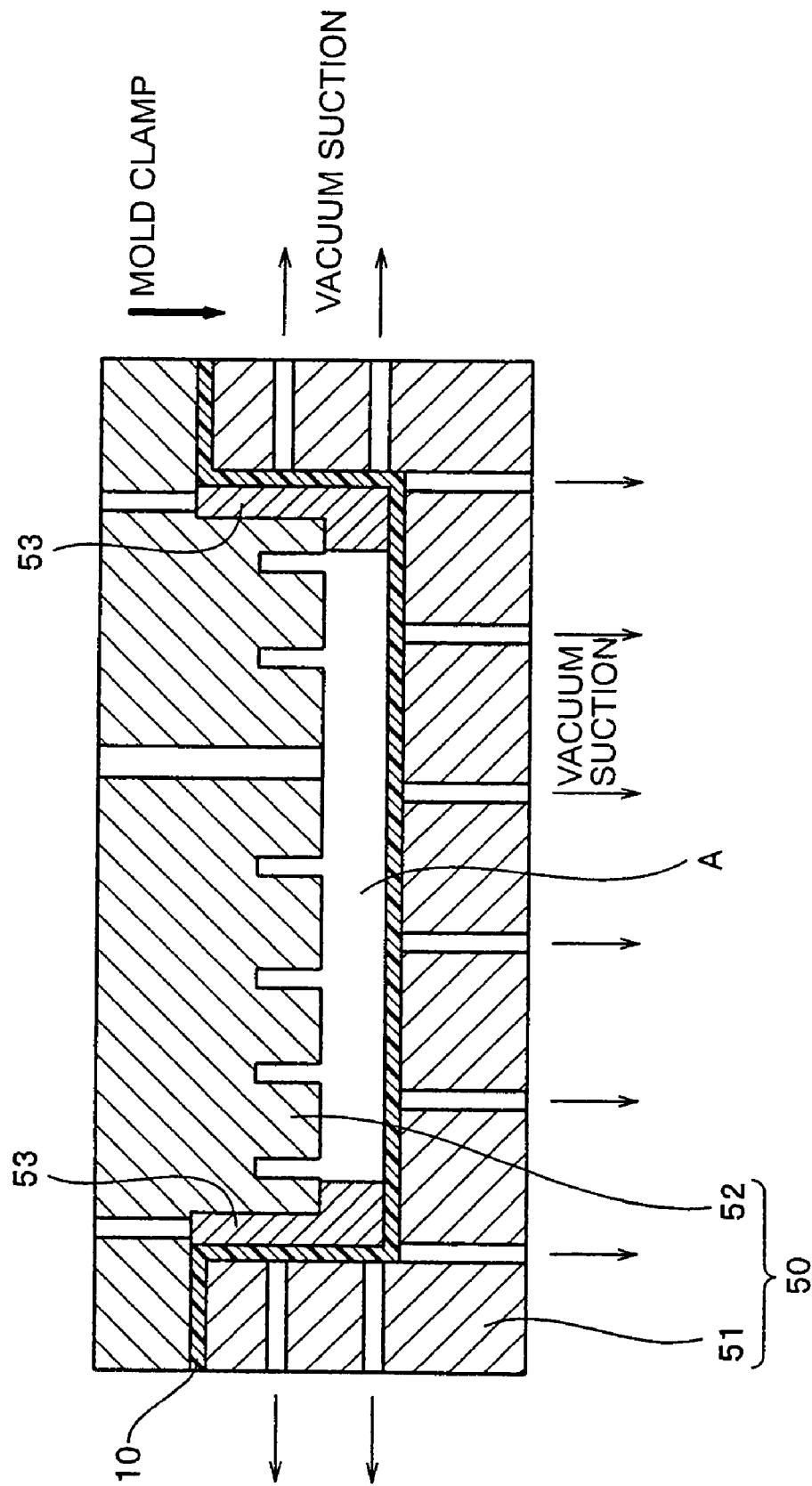
FIG. 7 is a cross sectional view of a mold schematically showing a state at a time of closing a mold at a time of forming the dash board in accordance with the first embodiment.
Figure 8:
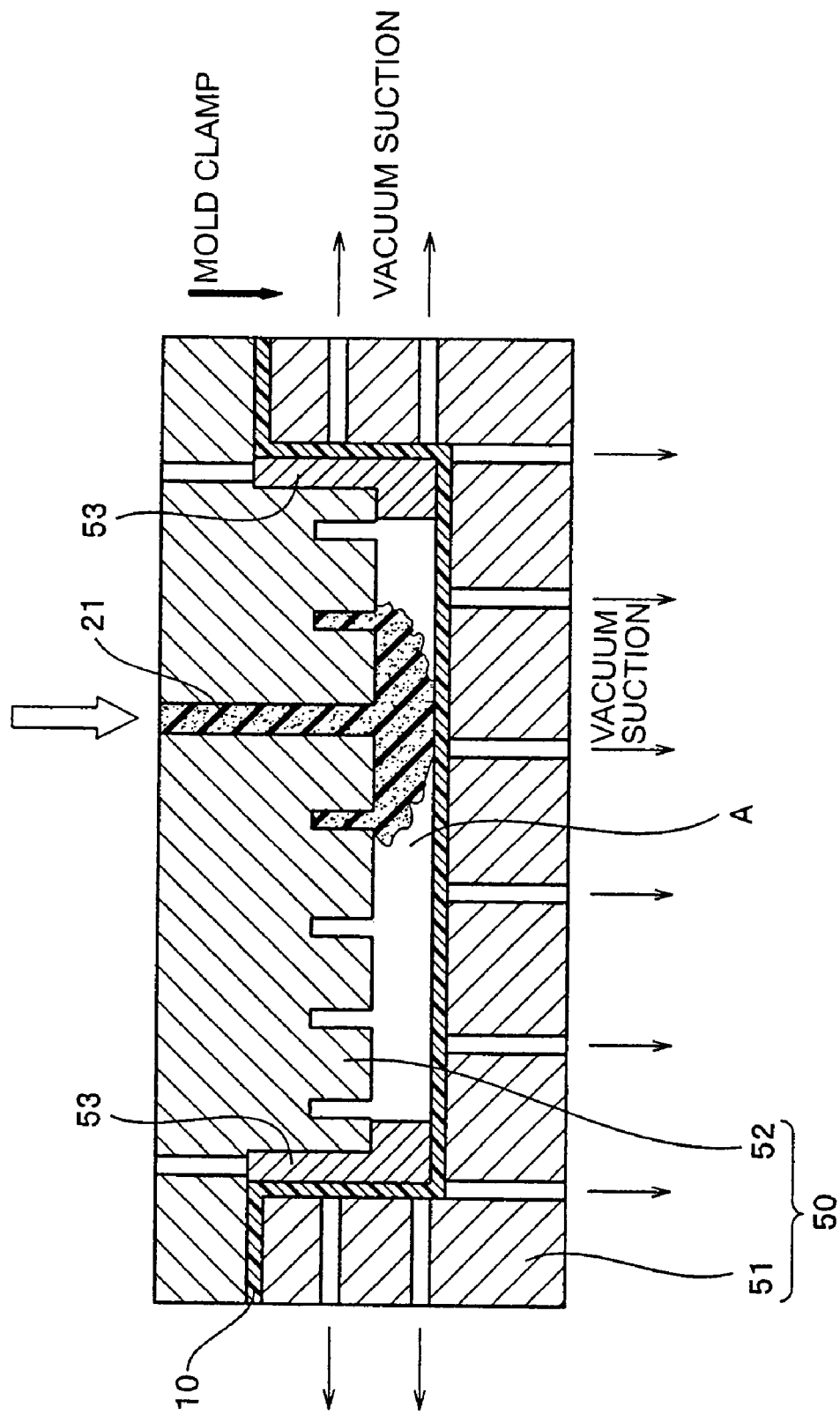
FIG. 8 is a cross sectional view showing a state at an initial stage of introducing a hard foaming material to a structure member forming space of the mold.
Figure 9:
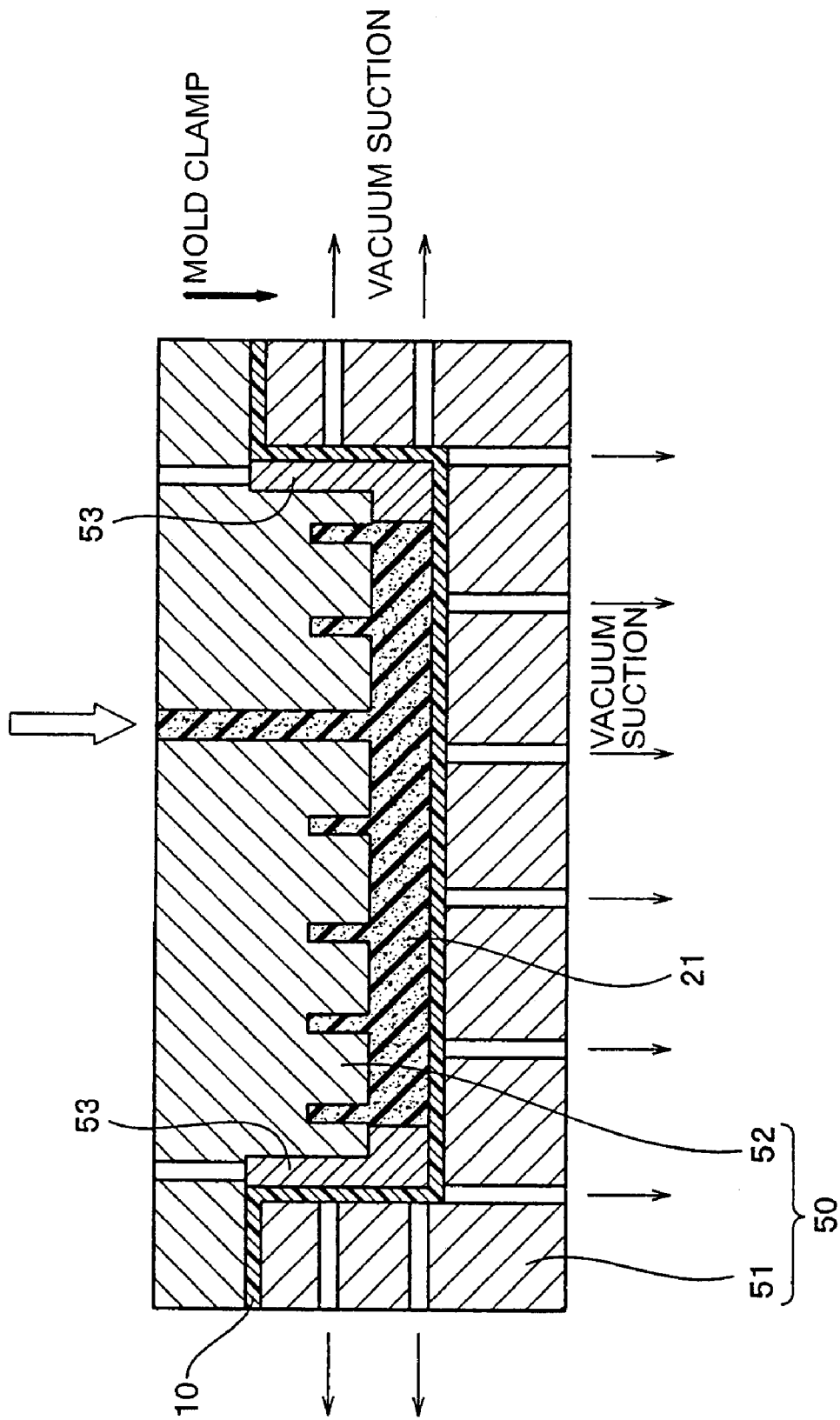
FIG. 9 is a cross sectional view showing a state at a time of finishing a foaming of the foamed body in the structure member forming space.

The skin member 10 obtained as mentioned above is first set along an inner surface shape of a lower mold 51, and is gripped by an inner surface of the lower mold 51 on the basis of a vacuum suction. At this time, the lower mold 51 is heated to 80 to 90° C. for softening the skin member 10. After setting the skin member 10 to the lower mold 51, a mold clamp is carried out while pinching a forming margin of the skin member 10 between the lower mold 51 and an upper mold 52, as shown in FIG. 7. A cavity (a core) of the upper mold 52 corresponds to a forming space of the structure member 21 occupying a most part of the inner portion supporting base member 20, and a space forming the cushion body 25 is excluded. If the mold clamp is carried out, a mixed material constituted by a mixed solution of an unfoamed hard urethane resin material and a water is introduced to a forming space A of the structure member 21 formed between the skin member 10 and the upper mold 52, as shown in FIG. 8. An adding amount of the water at this time is determined in accordance with a degree of the foaming. In this connection, a foaming magnification of the hard foamed polyurethane in the present embodiment is set to threefold. The unfoamed hard polyurethane material introduced to the forming space A starts foaming while instantaneously generating heat, the foamed polyurethane is finally filled within the forming space, and is integrated with a predetermined region of the skin member 10 as shown in FIG. 9, and the foaming process is finished. A foaming temperature at this time is between 50 and 60° C. A thickness of the structure member 21 is about 6 mm.

Figure 10:
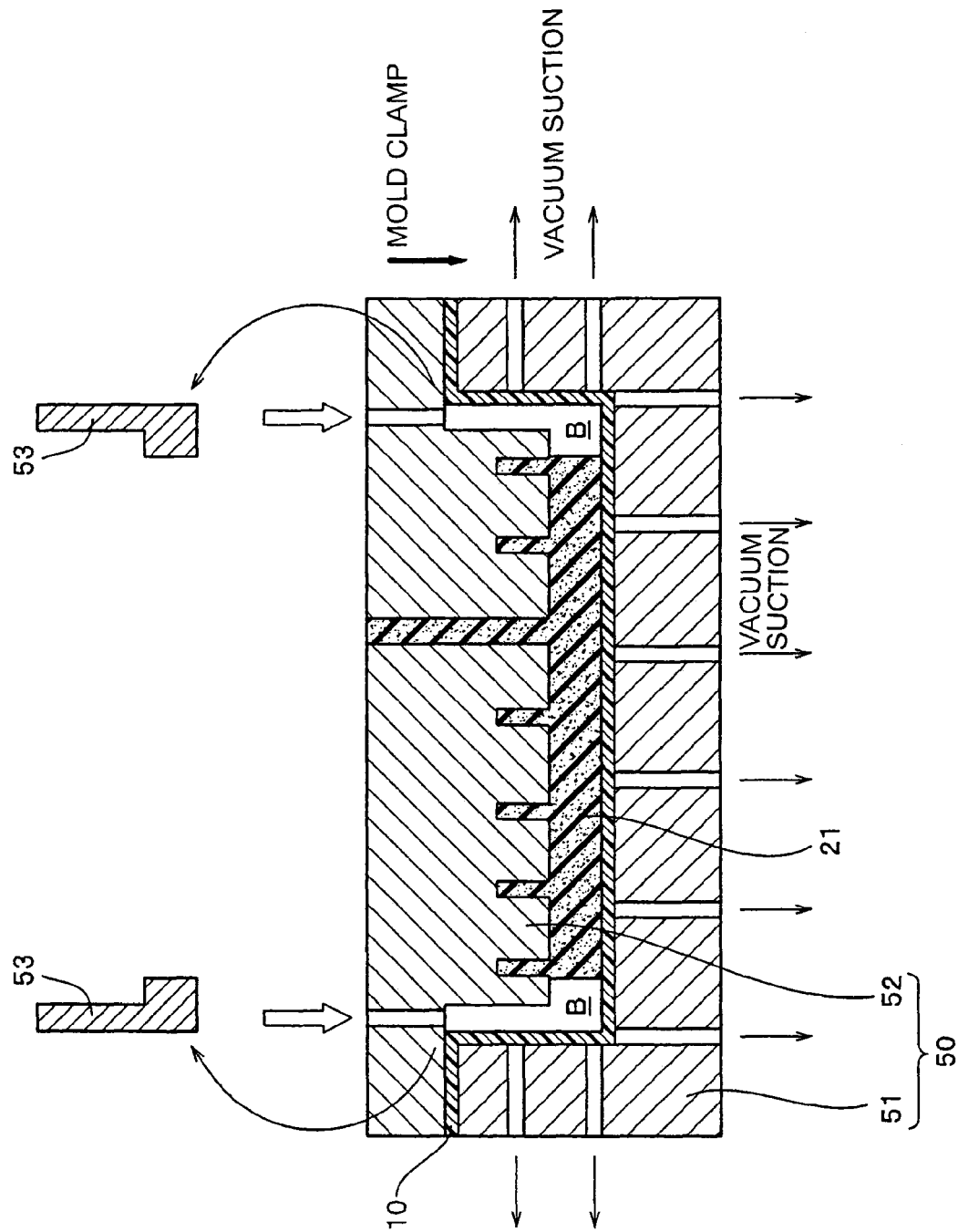
FIG. 10 is a cross sectional view showing a state of detaching an insertion mold from the mold and forming a cushion body forming space.
Figure 11:
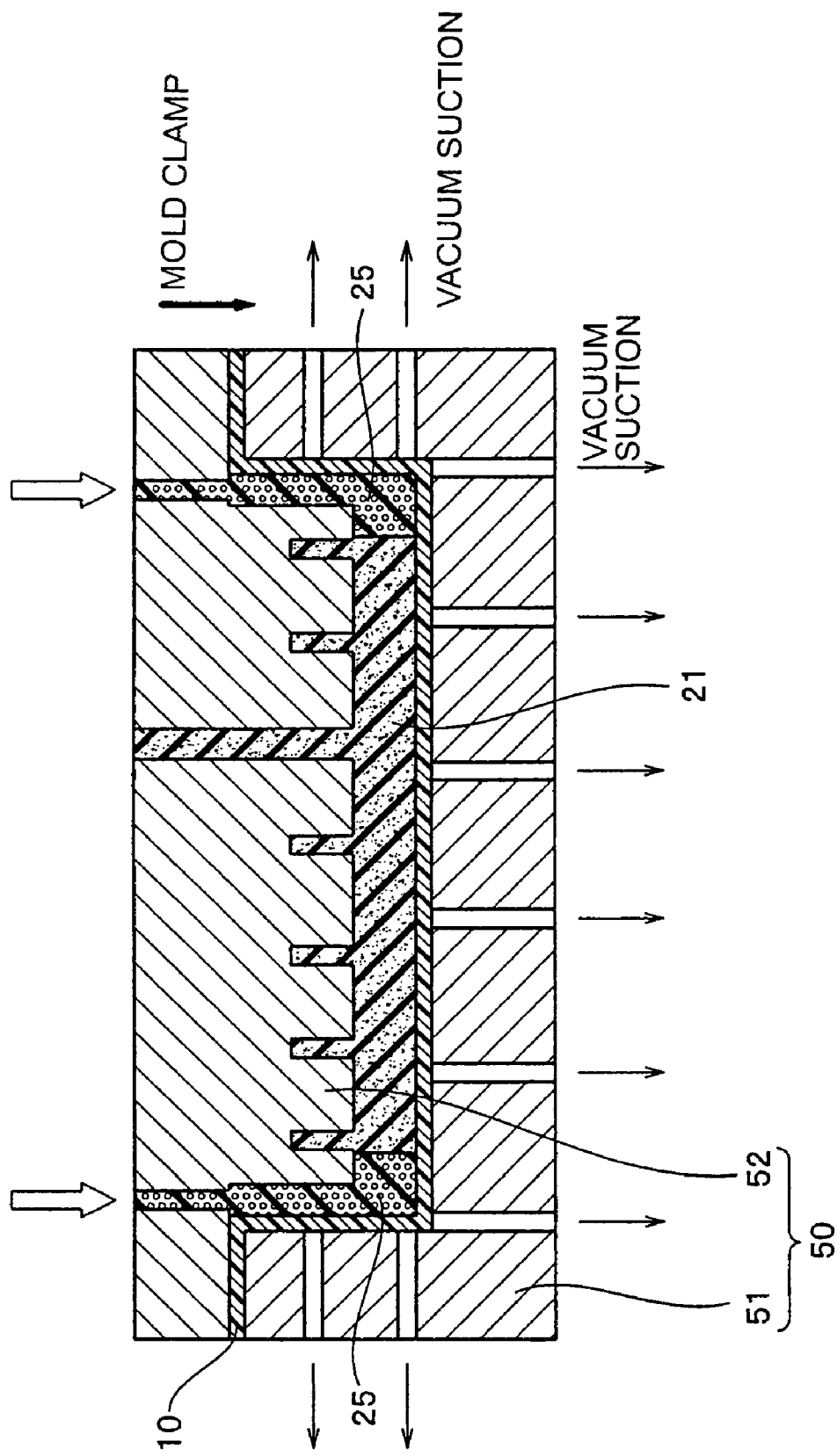
FIG. 11 is a cross sectional view showing a state at a time of finishing the foaming of a semi-hard foaming material in the cushion body forming space.

If the formation of the structure member 21 is finished, the same structure member 21 as the structure member 21 within the mold 50 is next formed between the structure member 21 and the skin member 10 which is not integrated, a forming space B of the cushion body 25 shown in FIG. 10 is formed, and a mixed raw material of a semi-hard urethane raw material and the water is introduced to an inner portion of the forming space B. In this case, the foaming is started at the same time as the introduction, in the same manner as the structure member 21, the forming space B is finally filled with the semi-hard foamed polyurethane as shown in FIG. 11, is integrated between the end surface of the structure member 21 and the end portion of the skin member 10 and is detached from the mold, and the formation is finished. In this connection, the hardness of the cushion body 25 in the present embodiment is equal to or smaller than C hardness 87 (Society of Rubber Industry, Japan Standard Specification SRIS 0101). In this case, since a heat quantity generated at a time when the cushion body 25 is foamed is less than a heat quantity generated at a time when the structure member 21 is foamed, it is preferable to regulate a mold temperature at a time of forming the cushion body 25 so as to be close to a temperature at a time of forming the structure member 21, while taking into consideration an effect on the basis of a heat generating temperature difference.

In the case of using the forming mold 50 used for forming the structure member 21 as the mold having the forming space B of the cushion body 25, it is preferable to arrange an auxiliary mold, for example, an insertion mold 53 or the like in the forming space B of the cushion body 25 in the whole forming space of the mold 50, draw off or detach the auxiliary mold after forming the structure member 21, and introduce the forming material of the cushion body 25 to the forming space B formed there. Further, it is possible to independently prepare the forming mold of the structure member 21 and the forming mold of the cushion body 25, and integrally form the skin member 10, the structure member 21 and the cushion body 25 by using the respective molds.

The dash board 100 obtained as mentioned above is incorporated to a dash board installing position existing in a front side of the driver seat. At a time of incorporating, the dash board 100 is inserted to the front side while maintaining a horizontal state between the posts 110 arranged in the left and right sides by setting the dash board 100 in a horizontal posture along an insertion surface in a state of inserting the dash board 100 between the left and right steel posts 110. In a closing stage of the insertion, the front side corner portions C1 of the concave notch portions 104 and 105 of the left and right wing portions 102 and 103 interfere with the left and right posts 110. Therefore, in accordance with the present embodiment, on the basis of the peculiar structure mentioned above to the present invention in which the periphery including the corner portion C1 is formed by the soft and easily elastically deformable cushion body 25, the corner portion C1 is elastically deformed and can easily pass between the left and right posts 110 even if the corner portion C1 is interfered with the posts 110, and it is possible to fit the posts 110 between both the front and rear corner portions. Further, in the case of inversely detaching the dash board 100 so as to inspect the instruments and gauges M or the like, a detaching operation is easily carried out in the same manner. Accordingly, since the dash board 100 can be easily attached and detached, for example, in an inspecting operation in the working spot, it is possible to easily correspond to an emergency inspection.

In this case, in the present embodiment, a rib 22 protruding linearly is simultaneously formed on a back surface of the structure member 21. The rub 22 not only have a function of securing a strength and a rigidity of the dash board 100, but also be provided with an absolutely new function which has not been conventionally thought, and constructs one important feature part in the present invention.

Figure 12:
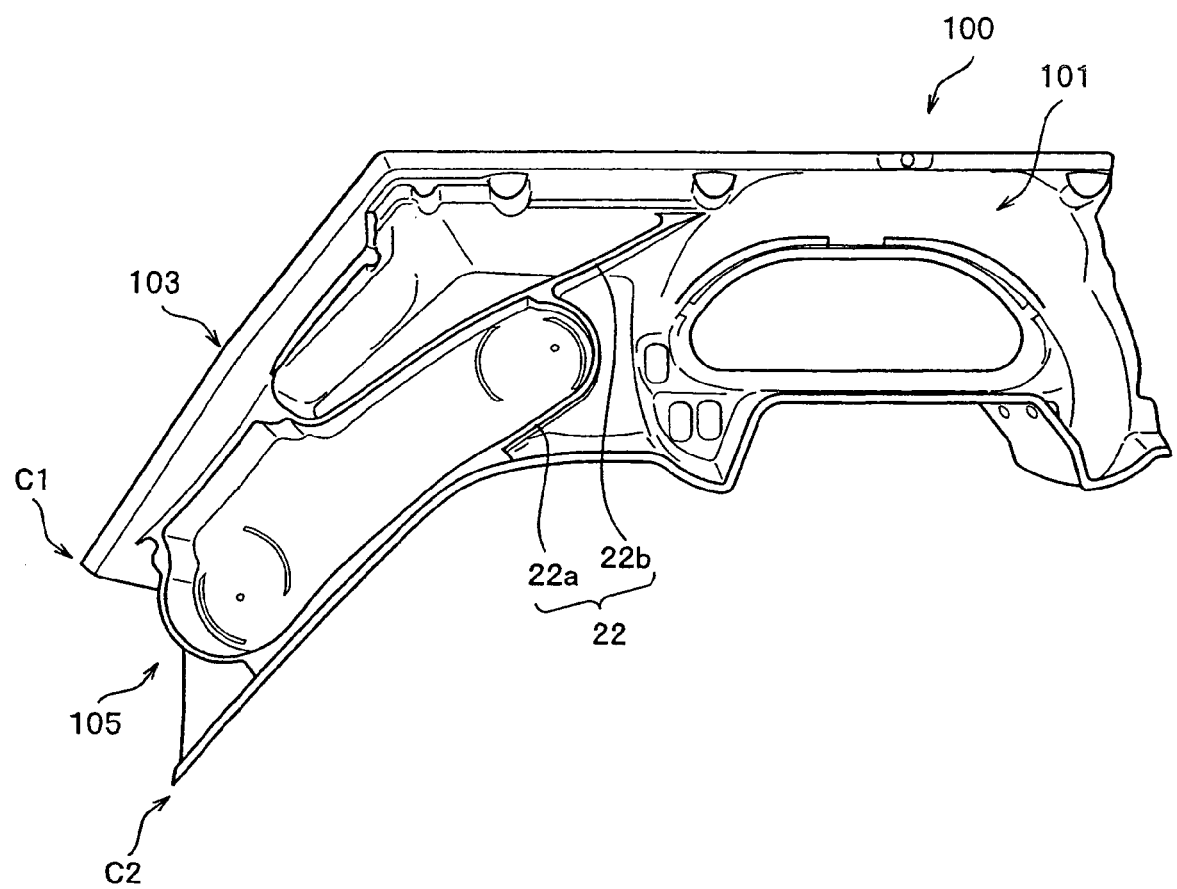
FIG. 12 is a back elevational view of a right half portion of a formed product.

FIG. 12 shows a back surface of a right half portion of the structure member 21, and the rib shape mentioned above is formed as a closed-loop shape in place of a simple linear rib shape, as is understood from the drawing. In the present embodiment, two pairs of ribs 22 are formed adjacently while having a partial rib portion in common per each of the wing portions 102 and 103 so as to be formed as the closed-loop shape having the triangular shape and the oval shape approximately over the back surface of the upper walls 102a and 103a of the left and right wing portions 102 and 103. Further, the air outlets 102c and 103 for the air conditioner are formed in a region which is adjacent to the concave notch portions 104 and 105 of the upper walls 102a and 103a surrounded by the oval rib 22a. Further, as shown in FIG. 3, the air outlets 102d and 103d for the defroster are formed back and forth while sandwiching each of the bent portions therebetween, in the upper walls 102a and 103a opposing to the glass surrounded by the triangular rib 22b.

Figure 13:
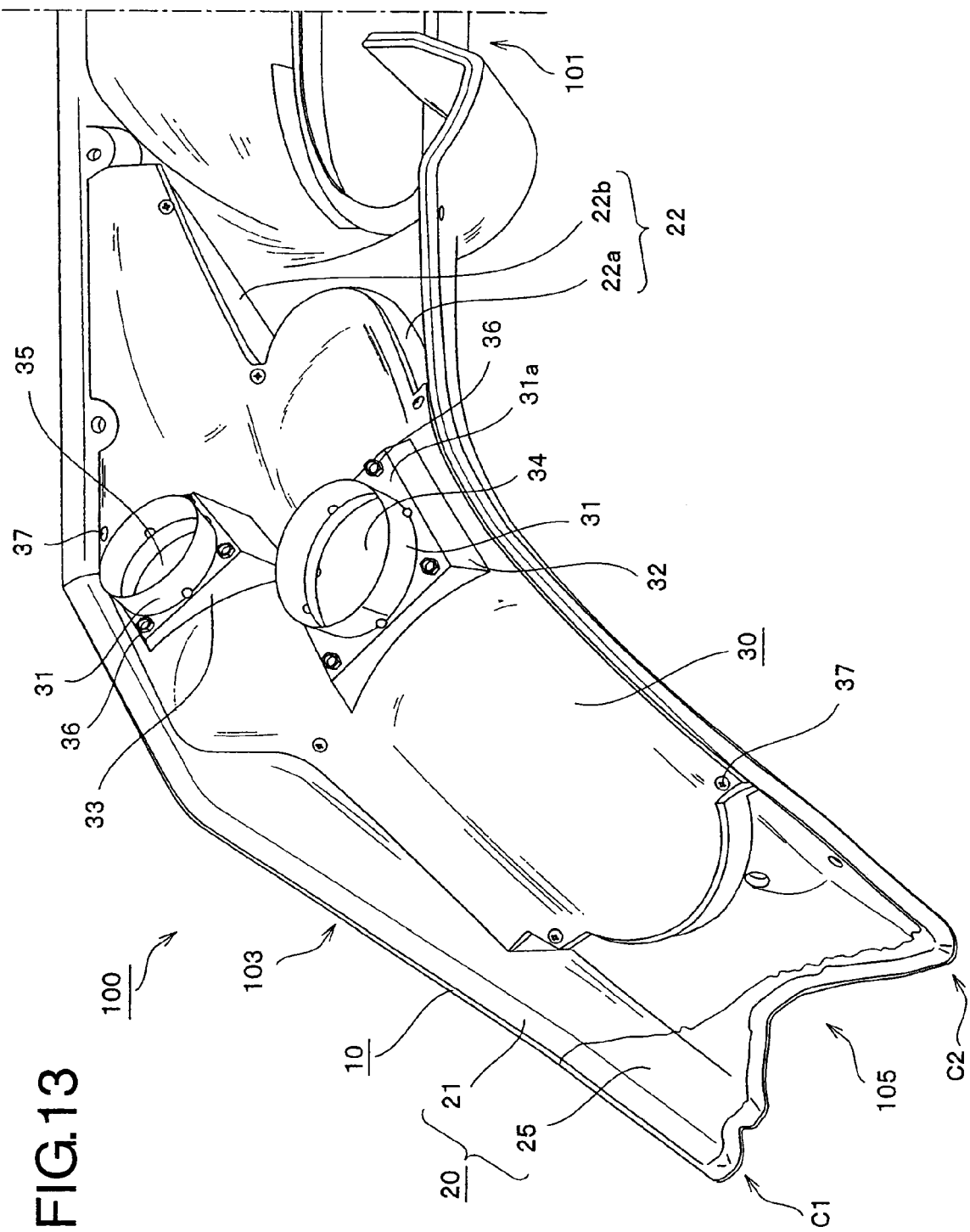
FIG. 13 is a partial perspective view showing a state in which a lid member is put on a region surrounded by a closed-loop shaped rib formed on the back surface of the formed product.
Figure 14:
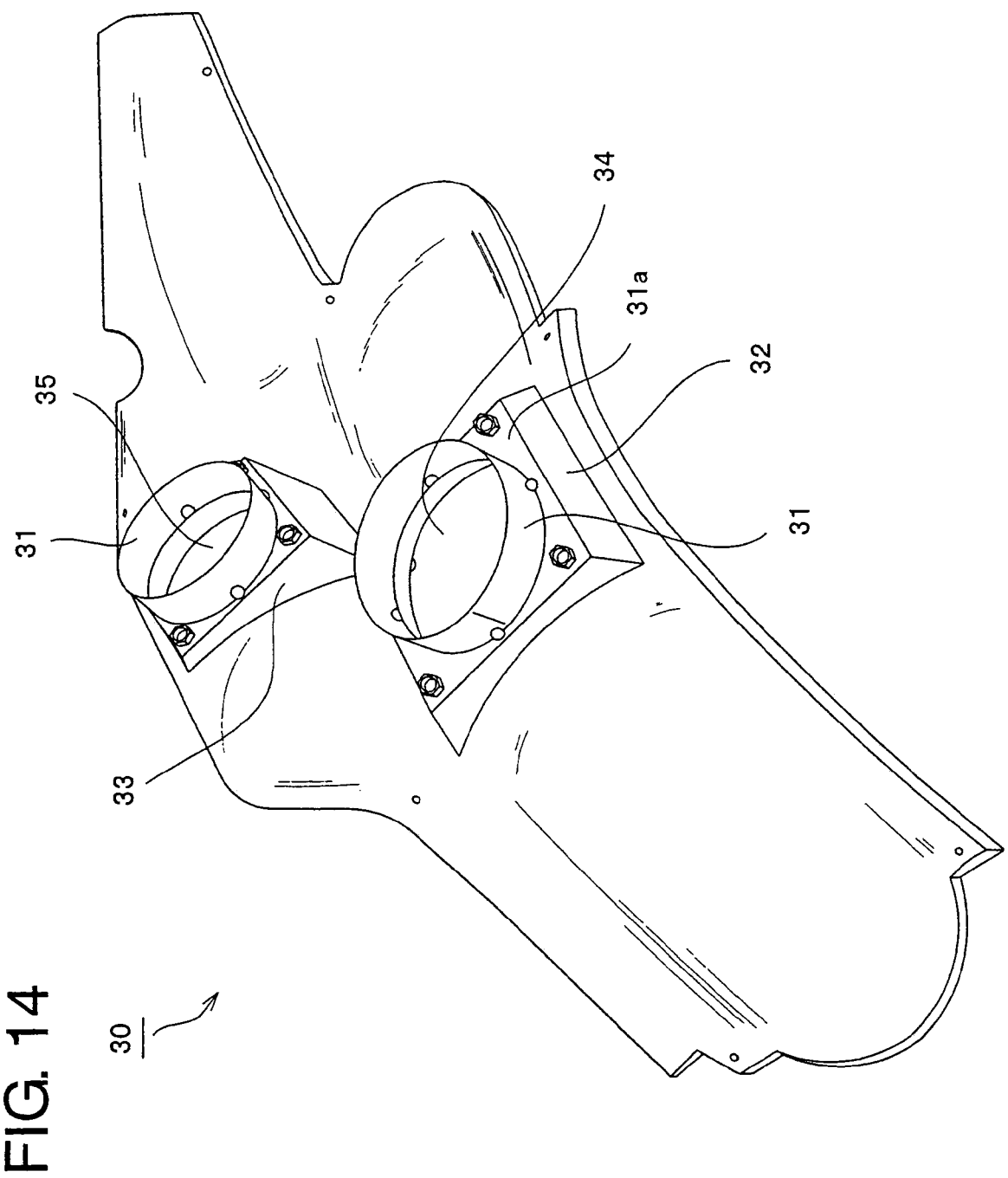
FIG. 14 is a perspective view at a time of viewing the lid member from an outer surface.

Two regions in one side surrounded by the closed-loop shaped rib 22 formed as mentioned above are covered by a lid member 30 structured by a hard foamed polyurethane which is the same material as the structure member 21 formed independently, as shown in FIG. 13. FIG. 14 shows the lid member 30 in an enlarged manner, and is constituted by a curved flat plate having an outer shape obtained by combining two closed-loop shaped ribs 22 comprising the oval rib 22a and the triangular rib 22b as a whole. In a position corresponding to the portion surrounded by the respective closed-loop shaped ribs 22a and 22b having the oval shape and the triangular shape in a center portion of the flat-shaped lid member 30, there are formed rectangular first and second thick portions 32 and 33 attaching a metal coupling ring 31 for connecting external ducts (not shown) for the air conditioner and the defroster thereto, and circular first and second air introduction holes 34 and 35 are formed in the center of the thick portions 32 and 33. The coupling ring 31 has a flange 31a having the same shape as attaching surfaces of the first and second thick portions 32 and 33 around a base end portion, and the coupling ring 31 is attached to the first and second thick portions 32 and 33 via the flange 31a by a stop screw 36. The lid member 30 having the structure mentioned above is previously adhered by an adhesive agent along the closed-loop shaped rib 21b, and is firmly attached to a plurality of sections such as corner portions of the rib 21b and the like by a screw 37 such as a tap screw or the like at a time of adhering. Accordingly, a thread hole for closing and fixing by the lid member 30 is formed at a plurality of positions such as the corner portions of the rib 22 and the like.

Since the lid member 30 is attached as mentioned above, the closed-loop shaped rib 22 in accordance with the present embodiment constructs a side wall surface of the ducts for the air conditioner and the defroster in addition to the function serving as the simple reinforcing rib which is generally provided. Accordingly, it is not necessary to freshly install the independently prepared ducts for the air conditioner and the defroster to the lower surface of the interior trim member after installing the interior trim member in the prior art. Further, the conventional duct is frequently constituted by the pipe manufactured by the hard synthetic resin, the dew condensation is easily generated in the cold district or the like, the rust of the peripheral metal parts is frequently generated. On the contrary, in accordance with the present embodiment, since the rib 22 is formed by the same hard foamed polyurethane as the structure member 21 as mentioned above, the rib 22 including the lid member 30 is excellent in a heat insulating property, and a thin smooth skin layer is formed on a wall surface of the rib 22 and an inner surface of the lid member 30 at a time of forming. Therefore, an air stream becomes extremely smooth. The rib 22 can employ a most rational design as the air passages for the air conditioner and the defroster, and it is not necessary to design such as to avoid the interference with the peripheral device as is different from the conventional independently installed type duct. Further, since the rib 22 forming the side wall of the duct is integrally formed at the same time of forming the dash board corresponding to the interior trim member, an extensive cost reduction is caused.

In this case, in the present embodiment, there is shown the case that the rib 22 is continuously formed as the closed-loop shape. The "closed-loop shape" in the present invention of course includes a closed-loop shape obtained as a result of coupling the rib end portions to each other by the side wall surface of the other parts or the like.

Figure 15:
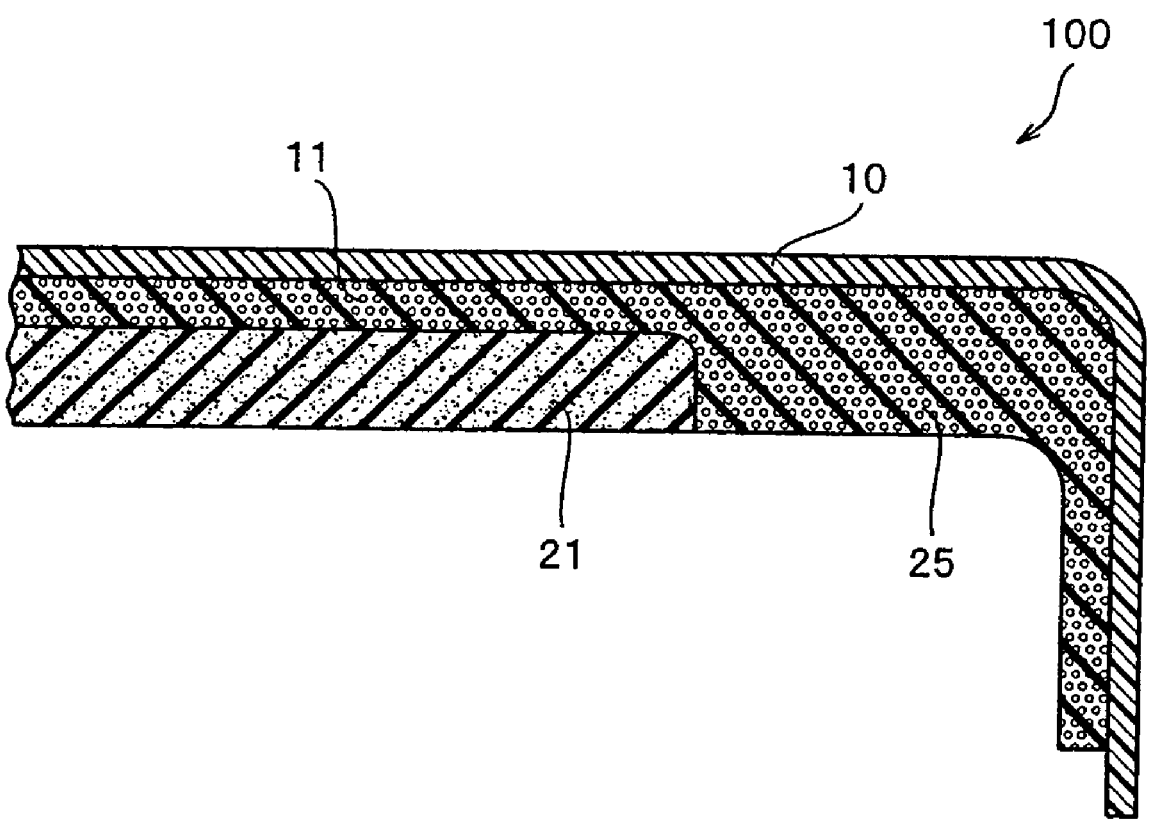
FIG. 15 is a cross sectional view of a mold schematically showing a state at a time of clamping a mold at a time of forming a dash board in accordance with a second embodiment.

FIG. 15 shows an end portion structure of a dash board 100 in accordance with a second embodiment of the present invention. The dash board 100 in accordance with the second embodiment is different from the dash board in accordance with the first embodiment in a point that a thin foamed polyurethane layer 11 is interposed between the skin member 10 and the structure member 21 so as to be integrated in the second embodiment in place of the structure in which the skin member 10 and the structure member 21 made of the foamed polyurethane are integrated in the first embodiment.

The foamed polyurethane layer 11 is interposed between the skin member 10 and the structure member 21 for the reason why a step is generated in the portion of the skin member 10 corresponding to the boundary portion between the structure member 21 and the cushion body 25 as shown in FIG. 16A in the case that the structure member 21 is previously integrated with the skin member 10 by the foaming, and the cushion body 25 is thereafter expansion molded in the end portion so as to be integrated with the remaining portion of the skin member 10 and a partial side surface of the structure member 21 such as the first embodiment. It is considered that this is caused by the fact that the expansion pressure (the molding pressure) and the molding temperature of the hard polyurethane are higher than the expansion pressure and the molding temperature of the semi-hard polyurethane. In accordance with the method of manufacturing the dash board 100 on the basis of the first embodiment, since the molding pressure and the molding temperature at that time are higher than those of the second embodiment, a drawing depth of the drawing pattern formed on the surface of the skin member 10 becomes relatively deeper in the latter than in the former, and a difference is generated in a surface outer appearance with respect to the boundary between both the regions.

Accordingly, the dash board structure in accordance with the second embodiment is carried out for doing away with the difference between the step and the outer appearance mentioned above, and is manufactured by a second manufacturing method mentioned below. Therefore, a description will be specifically given below mainly of a method which is particularly suitable for manufacturing the dash board 100 mentioned above in accordance with the second embodiment, with reference to the drawings. In this case, the same reference numerals are attached to substantially the same portion in the second embodiment as the first embodiment, and a specific description will be omitted for avoiding a redundancy.

Figure 17:
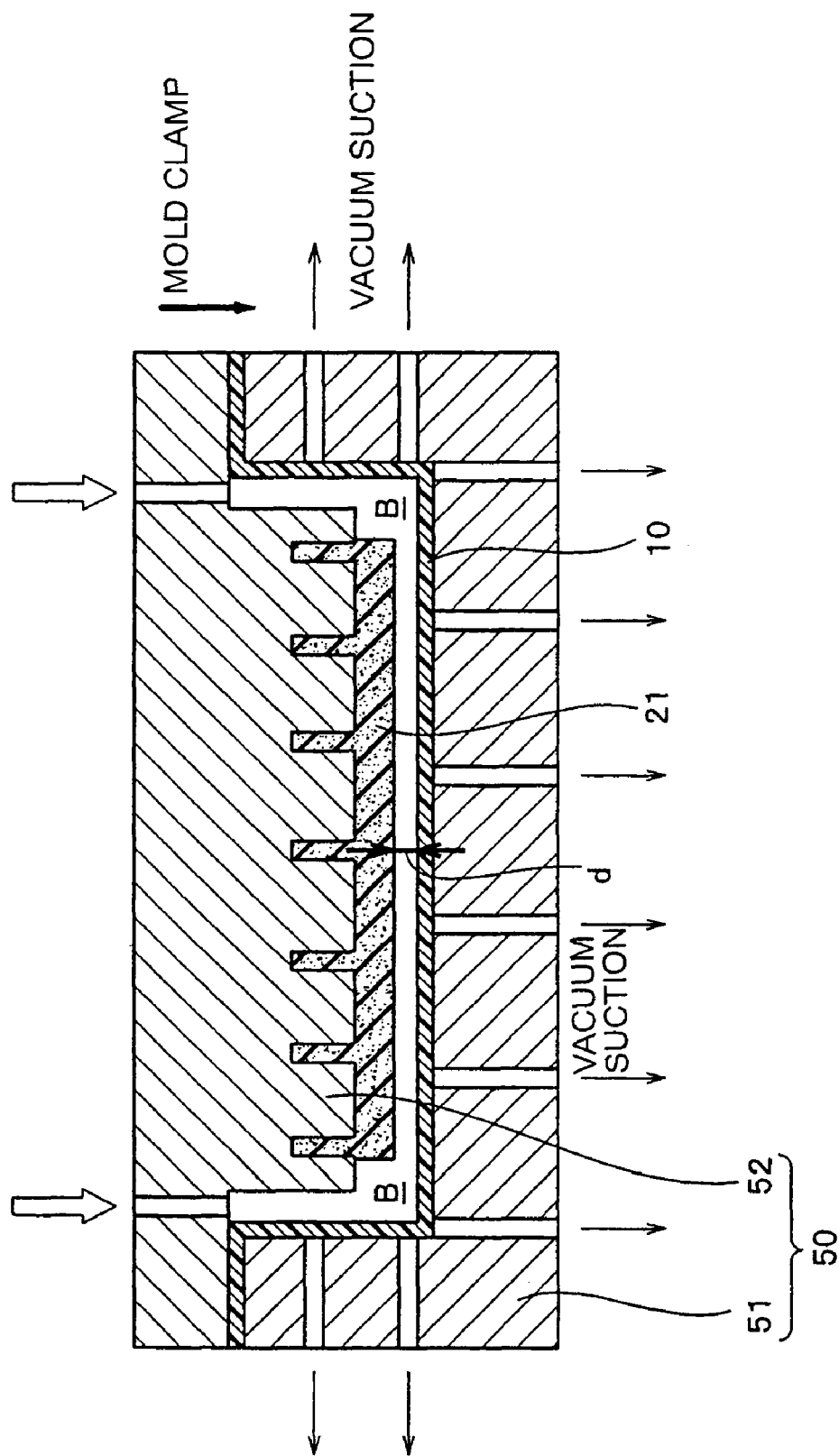
FIG. 17 is a cross sectional view showing a state at a time of clamping the mold in accordance with the second embodiment.

In the method of manufacturing the dash board 100 in accordance with the present embodiment, the skin member 10 made of the vinyl chloride sheet and the structure member 21 made of the foamed polyurethane are first molded in a desired shape previously. Of course, a closed-loop shaped duct rib 22 is integrally formed on a back surface in an opposite side to the skin member side of the structure member 21 at this time. The skin member 10 is set in the lower mold 51 while setting a back surface side to a lower side so as to heat, and is closely attached and held along an inner surface shape of the lower mold 51 by a vacuum suction. On the other hand, the previously molded structure member 21 is closely attached and mounted to an internal space of the upper mold 52 so as to leave the cushion body forming space B. The mold is closed at this time. At this mold closing time, a gap d having a small dimension as shown in FIG. 17 is formed between the skin member 10 and the structure member 21 so as to be communicated with the cushion body forming space B. In the present embodiment, the gap g is set to about 3 mm.

In this state, if the semi-hard foamed polyurethane raw material is introduced to the forming space B of the cushion body 25, the raw material immediately starts foaming so as to be expanded to a gap between the skin member 10 and the structure member 21 in addition to the forming space while foaming, and fills all the spaces so as to finish molding. As a result, the cushion body 25 made of the foamed polyurethane which is soft and is elastically deformable is bonded and integrated to a part of the back surface of the skin member 10 and the side surface of the structure member 21, in the peripheral portion including the concave notch portions 104 and 105 of the left and right wing portions 102 and 103 of the dash board 100, and the thin foamed polyurethane made of the same material is interposed and integrated between the skin member 10 and the structure member 21.

In accordance with the dash board 100 on the basis of the present embodiment obtained as mentioned above, the step appearing in the surface of the peripheral portion of the undercut portions 104 and 105 of the skin member 10 in the first embodiment falls away as shown in FIG. 16A, and the boundary line between the structure member 21 and the cushion body 25 disappears and the flat surface is formed as shown in FIG. 16B. Further, the drawing depth of the drawing pattern formed on the surface of the skin member 10 in the structure member region and the cushion body region arranged in the left and right sides while sandwiching the boundary therebetween is not changed, and a glossy surface having a uniform drawing pattern left is finished. This is because the molding pressure (the foaming pressure) and the molding temperature of the semi-hard foamed polyurethane applied to the skin member 10 become uniform over a whole surface of the skin member 10, at a time of foaming the cushion body 25.

In the manufacturing method in accordance with the present embodiment, since it is possible to easily manufacture by preparing the final mold 50 doing away with the insertion mold in the first embodiment and carrying out one time foaming of the cushion body 25, while previously molding the structure member 21, it is possible to achieve a wide cost reduction.

In this case, the above is only the description of the typical embodiment in accordance with the present invention, for example, the cushion body is arranged in the periphery including the concave notch portions of the left and right wing portions of the dash board. However, the cushion body may be constituted by one of the left and right concave notch portions, and the side walls of the left and right wing portions can be set to the cushion body region. The present invention can employ various materials and design changes within the range of the structure described in claims.

The invention claimed is:

1. An interior trim member, comprising a panel-shape, is incorporated in an incorporating portion of a work vehicle, and has a desired curved shape in which a skin member is integrally covered on a front surface, wherein
   an interference region interfering with an interference body existing in the incorporating portion is provided at least in one of right and left side edge portions which are orthogonal to an attaching and detaching direction parallel to a panel surface of the interior trim member,
   a concave notch portion to which the interference body is fitted is formed in the interference region,
   the interference region of the interior trim member is formed as an elastic region constituted by a cushion body made of an elastically deformable material,
   a region other than the elastic region of the interior trim member is set to a hard region constructed by a structure member which is light and is made of a harder material than the cushion member, and
   the skin member, the cushion body and the structure member are integrally formed.

2. The interior trim member according to claim 1, wherein a hardness of the cushion body is equal to or less than 87 in C hardness (Society of Rubber Industry, Japan Standard Specification SRIS 0101), an elastic module in bending of the structure member is equal to or more than 500 MPa, a bending strength is equal to or more than 20 MPa, and a coefficient of thermal conductivity is equal to or less than 0.1 W/m° K.

3. The interior trim member according to claim 1, wherein at least the cushion body is constituted by a foamed body such as a semi-hard polyurethane resin or a thermoplastic elastomer, and the structure body is made of a thermosetting resin material.

4. The interior trim member according claim 1, wherein at least the cushion body is integrally formed in a part of the structure member and the skin member by a foaming.

5. The interior trim member according to claim 3, wherein the structure member is structured by a foaming material.

6. The interior trim member according to claim 5, wherein the thermosetting resin is constituted by a hard polyurethane resin.

7. The interior trim member according to claim 5, wherein a plurality of ribs are formed on a back surface of the structure member by an integral molding.

8. The interior trim member according to claim 6, wherein the ribs construct a wall surface of a ventilation passage, an open surface of the wall surface is closed by a lid member so as to form two or more ventilation passages, and the ventilation passage has through holes for an air conditioner and a defroster.

9. A method of manufacturing a interior trim member which has a panel-shape, is incorporated in an incorporating portion of a work vehicle, and has a desired curved shape in which a skin member is integrally covered on a front surface, the method being characterized by comprising:

arranging a skin member along a cavity of at least one of a pair of upper and lower molds so as to come close contact, preliminary arranging a structure member which is light and is made of a hard thermosetting resin having a rigidity in a non-interference region of a cavity of the other mold which is not interfered with an interference body existing in the incorporating portion of at least one of right and left side edge portions which are orthogonal to an attaching and detaching direction parallel to a panel surface of the interior trim member at a time of being detached and attached to the interference body; and filling a cushion member at least in an interference region interfering with the interference body formed between a mold having an upper mold and a lower mold at a time of closing the mold, and the skin member and the structure member, so as to integrally form with the skin member and the structure member.

10. The method of manufacturing the interior trim member according to claim 9, comprising:

integrating the structure member with the skin member by a laminate formation; and introducing a soft polyurethane into a space formed between the mold at a time of closing the mold and the skin member and the structure member so as to foam on the spot and integrate the cushion body with the skin member and the structure member.

11. The method of manufacturing the interior trim member according to claim 9, comprising:

previously shaping the structure member in a desired curved shape so as to closely attach and fix to the other mold by a vacuum suction.

12. The method of manufacturing an interior trim member according to claim 9, comprising:

previously forming the structure member, forming a gap between the skin member and the structure member which are arranged in the lower mold and the upper mold at a time of closing the mold; and integrally molding the cushion body between the skin member and the structure member by introducing a soft polyurethane resin to all the space including the gap formed between the molds at a time of closing the mold, and the skin member and the structure member so as to foam on the spot.

* * * * *